(12) United States Patent
Tsuji

(10) Patent No.: US 10,366,188 B2
(45) Date of Patent: Jul. 30, 2019

(54) DESIGNING APPARATUS FOR DESIGNING A PROGRAMMABLE LOGIC DEVICE, METHOD OF DESIGNING A PROGRAMMABLE LOGIC DEVICE AND RECORDING MEDIUM FOR STORING A PROGRAM FOR DESIGNING A PROGRAMMABLE LOGIC DEVICE

(71) Applicant: FUJITSU LIMITED, Kawasaki-shi, Kanagawa (JP)

(72) Inventor: Hideo Tsuji, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 186 days.

(21) Appl. No.: 15/200,515

(22) Filed: Jul. 1, 2016

(65) Prior Publication Data
US 2017/0024004 A1 Jan. 26, 2017

(30) Foreign Application Priority Data
Jul. 23, 2015 (JP) .................................. 2015-146111

(51) Int. Cl.
*G06F 17/50* (2006.01)
(52) U.S. Cl.
CPC ...... *G06F 17/5036* (2013.01); *G06F 2217/78* (2013.01); *G06F 2217/84* (2013.01)
(58) Field of Classification Search
CPC .................................................. G06F 1/3296
See application file for complete search history.

(56) References Cited

U.S. PATENT DOCUMENTS 6,868,503 B1 * 3/2005 Maksimovic ......... G06F 1/3203
713/401
7,142,009 B1 * 11/2006 Watt .................... H03K 19/0008
326/38

(Continued)

FOREIGN PATENT DOCUMENTS

JP 2006-163815 6/2006
JP 2008-263261 10/2008

(Continued)

OTHER PUBLICATIONS

Japanese Office Action dated May 7, 2019 for corresponding Japanese Patent Application No. 2015-146111, with English Translation, 7 pages.

*Primary Examiner* — Kim Huynh
*Assistant Examiner* — Joshua Neveln
(74) *Attorney, Agent, or Firm* — Fujitsu Patent Center

(57) ABSTRACT

An apparatus includes a processor and a memory configured to store design data used for disposition and wiring of a logic circuit on a programmable logic device, and store a table indicating a relationship between a power supply voltage value and a delay amount for each type of element in the logic circuit, the relationship having a nature to set the delay amount so as to increase in value as the power supply voltage value is smaller. The processor determines, as an optimum voltage value, a power supply voltage value at which the delay margin of a critical path indicates a desired value that is in the positive and is a minimum value. The processor outputs configuration information including the optimum voltage value and the design data so as to form the logic circuit on the programmable logic device supplied with a voltage determined by the optimum voltage value.

12 Claims, 18 Drawing Sheets

(56) References Cited

U.S. PATENT DOCUMENTS

| | | |
|---|---|---|
| 9,413,344 B2 * | 8/2016 | Bowman .................. H03K 5/13 |
| 9,760,672 B1 * | 9/2017 | Taneja ................ G06F 17/5081 |
| 2008/0034235 A1 | 2/2008 | Houshaku |
| 2009/0085653 A1 | 4/2009 | Inoue |
| 2011/0138347 A1 | 6/2011 | Tetelbaum |
| 2011/0276321 A1 | 11/2011 | Tuan et al. |
| 2012/0246605 A1 | 9/2012 | Kitaoka et al. |

FOREIGN PATENT DOCUMENTS

| | | |
|---|---|---|
| JP | 2009-86848 | 4/2009 |
| JP | 2011-530763 | 12/2011 |
| JP | 2012-203561 | 10/2012 |
| JP | 2013-37472 A | 2/2013 |
| JP | 2013-532319 A | 8/2013 |
| WO | 2011/139597 A1 | 11/2011 |

* cited by examiner

FIG. 4

| POWER SUPPLY VOLTAGE (V) | DELAY AMOUNT (ns) | | | |
|---|---|---|---|---|
| | LUT | FLIP-FLOP | DATA WIRING LINE | CLOCK WIRING LINE |
| 0.9 (MINIMUM VALUE) | 0.580 | 0.480 | 0.180 | 0.205 |
| 0.91 | 0.554 | 0.460 | 0.172 | 0.204 |
| 0.92 | 0.528 | 0.440 | 0.164 | 0.203 |
| 0.93 | 0.502 | 0.420 | 0.156 | 0.202 |
| 0.94 | 0.476 | 0.400 | 0.148 | 0.201 |
| 0.95 | 0.450 | 0.380 | 0.140 | 0.200 |
| 0.96 | 0.424 | 0.360 | 0.132 | 0.199 |
| 0.97 | 0.398 | 0.340 | 0.124 | 0.198 |
| 0.98 | 0.372 | 0.320 | 0.116 | 0.197 |
| 0.99 | 0.346 | 0.300 | 0.108 | 0.196 |
| 1 (PRESCRIBED VALUE) | 0.320 | 0.280 | 0.100 | 0.195 |
| 1.01 | 0.294 | 0.260 | 0.092 | 0.194 |
| 1.02 | 0.268 | 0.240 | 0.084 | 0.193 |
| 1.03 | 0.242 | 0.220 | 0.076 | 0.192 |
| 1.04 | 0.216 | 0.200 | 0.068 | 0.191 |
| 1.05 | 0.190 | 0.180 | 0.060 | 0.190 |
| 1.06 | 0.164 | 0.160 | 0.052 | 0.189 |
| 1.07 | 0.138 | 0.140 | 0.044 | 0.188 |
| 1.08 | 0.112 | 0.120 | 0.036 | 0.187 |
| 1.09 | 0.086 | 0.100 | 0.028 | 0.186 |
| 1.1 (MAXIMUM VALUE) | 0.060 | 0.080 | 0.020 | 0.185 |

FIG. 5A
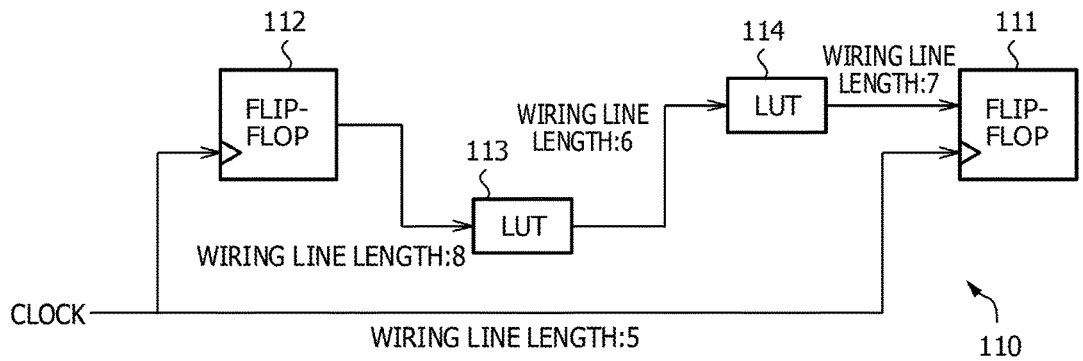
FIG. 5B
|  | LUT | FLIP-FLOP | DATA WIRING LINE (PER UNIT LENGTH) | CLOCK WIRING LINE (PER UNIT LENGTH) |
|---|---|---|---|---|
| DELAY AMOUNT (ns) | 0.32 | 0.28 | 0.1 | 0.195 |
FIG. 5C
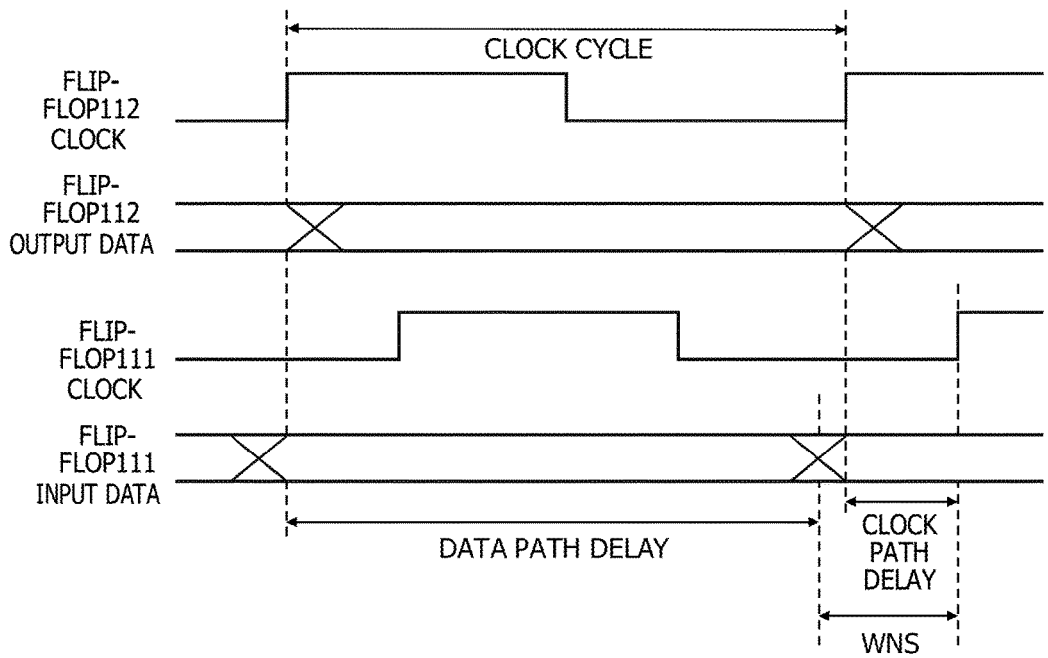

DESIGNING APPARATUS FOR DESIGNING A PROGRAMMABLE LOGIC DEVICE, METHOD OF DESIGNING A PROGRAMMABLE LOGIC DEVICE AND RECORDING MEDIUM FOR STORING A PROGRAM FOR DESIGNING A PROGRAMMABLE LOGIC DEVICE

CROSS-REFERENCE TO RELATED APPLICATION

This application is based upon and claims the benefit of priority of the prior Japanese Patent Application No. 2015-146111, filed on Jul. 23, 2015, the entire contents of which are incorporated herein by reference.

FIELD

The present technology relates to a designing apparatus and method and a recording medium.

BACKGROUND

It is known to reduce the increase of power consumption of a large-scale semiconductor integrated circuit (LSI) using static timing analysis (STA) or the like by the simulation program with integrated circuit emphasis (SPICE) or the like upon designing of the LSI (for example, refer to Patent Documents 1 to 3). In an example, an optimum power supply voltage value is determined for each device by incorporating a ring oscillator in the LSI and using a table indicating a relationship between an oscillation period of the incorporated ring oscillator and the optimum voltage value of the LSI. When the table indicating a relationship between an oscillation period and an optimum voltage value is created, the dispersion of process parameters such as the gate length is reflected on the table by analysis of a critical path by a simulation of the SPICE or the like. By determining an optimum voltage value using the table on which the dispersion of a plurality of process parameters such as the gate length is reflected, the optimum voltage value is determined with a higher degree of accuracy than a conventional model by which it is estimated that all process parameters vary all at once in the worst direction. Since the table indicating a relationship between an oscillation period and an optimum voltage value is created for each logic circuit in which a critical path is different from that in the other logic circuits, static timing analysis by a simulation of the SPICE or the like is executed for each logic circuit in which a critical path is different from that of the other logic circuits. Since a simulation of the SPICE or the like is executed generally with a great number of processing steps, there is the possibility that the load on a circuit designer increases by executing static timing analysis by a simulation of the SPICE or the like for each logic circuit in which a critical path is different from that of the other logic circuits.

Further, a programmable logic device (PLD) that is also called field programmable gate array (FPGA) and is a logic circuit capable of being reconfigured in accordance with a change of a circuit to be incorporated is known (for example, refer to Patent Documents 4 and 5). The FPGA includes a great number of basic logic cell circuits and a coupling switch circuit that couples the basic logic cell circuits with each other. The basic logic cell circuits are individually configured so as to perform a desired operation and are coupled with each other through the coupling switch circuit.

As examples of the prior art, Japanese Laid-open Patent Publication No. 2009-86848, Japanese Laid-open Patent Publication No. 2012-203561, Japanese National Publication of International Patent Application No. 2011-530763, Japanese Laid-open Patent Publication No. 2006-163815 and Japanese Laid-open Patent Publication No. 2008-263261 are known.

SUMMARY

According to an aspect of the embodiments, a designing apparatus includes a processor and a memory configured to store disposition and wiring information used for disposition and wiring of a logic circuit on a programmable logic device, and store a delay amount table indicating a relationship between a power supply voltage value and a delay amount for each type of element in the logic circuit, the relationship having a nature to set the delay amount so as to increase in value as the power supply voltage value is smaller. The processor is configured to determine a critical path whose delay margin is minimum from among paths included in the logic circuit from the disposition and wiring information. The processor is configured to determine a power supply voltage value at which the delay margin of the critical path indicates a desired value that is in the positive and is a minimum value as an optimum voltage value to be applied to the programmable logic device, the delay margin calculated using the delay amount value corresponding to the each type of element in the critical path of the logic circuit. The processor is configured to generate configuration information including the optimum voltage value and the disposition and wiring information. And, the processor is configured to output the configuration information so as to form the logic circuit on the programmable logic device which is supplied with a power supply voltage determined by the optimum voltage value.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a view depicting an example of a delay amount table;

FIG. 5A is a view depicting an example of a critical path, FIG. 5B is a view depicting a delay amount used when the critical path is determined and FIG. 5C is a view depicting a delay margin of the critical path;

DESCRIPTION OF EMBODIMENTS

In the FPGA, similarly to other LSIs, a permissible delay amount of a critical path varies in response to a configuration of a logic circuit, an operation frequency and a power supply voltage. In order to reduce the power consumption of the FPGA, it is demanded to optimize the power supply voltage in response to a permissible delay amount of the critical path or the like. In the conventional FPGA designing apparatus, designing of a logic circuit or analysis of a delay amount is performed assuming that the apparatus operates within a range of a given highest operation frequency and power supply voltage. In the conventional FPGA designing apparatus, since it is assumed that the apparatus operates within a range of a given highest operation frequency and power supply voltage, it is not easy to optimize the power supply voltage value exceeding a range of a given power supply voltage by optimizing the delay amount of a critical path.

As one aspect of the present embodiment, provided are solutions for a PLD design capable of optimizing a power supply voltage value of a PLD by optimizing a delay amount of a critical path.

In the following, a PLD designing apparatus and a designing method therefor according to the present technology are described with reference to the drawings. However, the technical scope of the present technology is not limited to the embodiments described below. The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

Outline of PLD Designing Apparatus According to Embodiment

A PLD designing apparatus according to the present embodiment determines a power supply voltage value using a table indicating a relationship between a power supply voltage value and a delay amount so as to minimize a delay margin of a critical path. By determining the power supply voltage value so as to minimize a delay margin of the critical path of a logic circuit, a power supply voltage of a PLD is optimized taking disposition and wiring information into account.

Figure 1:
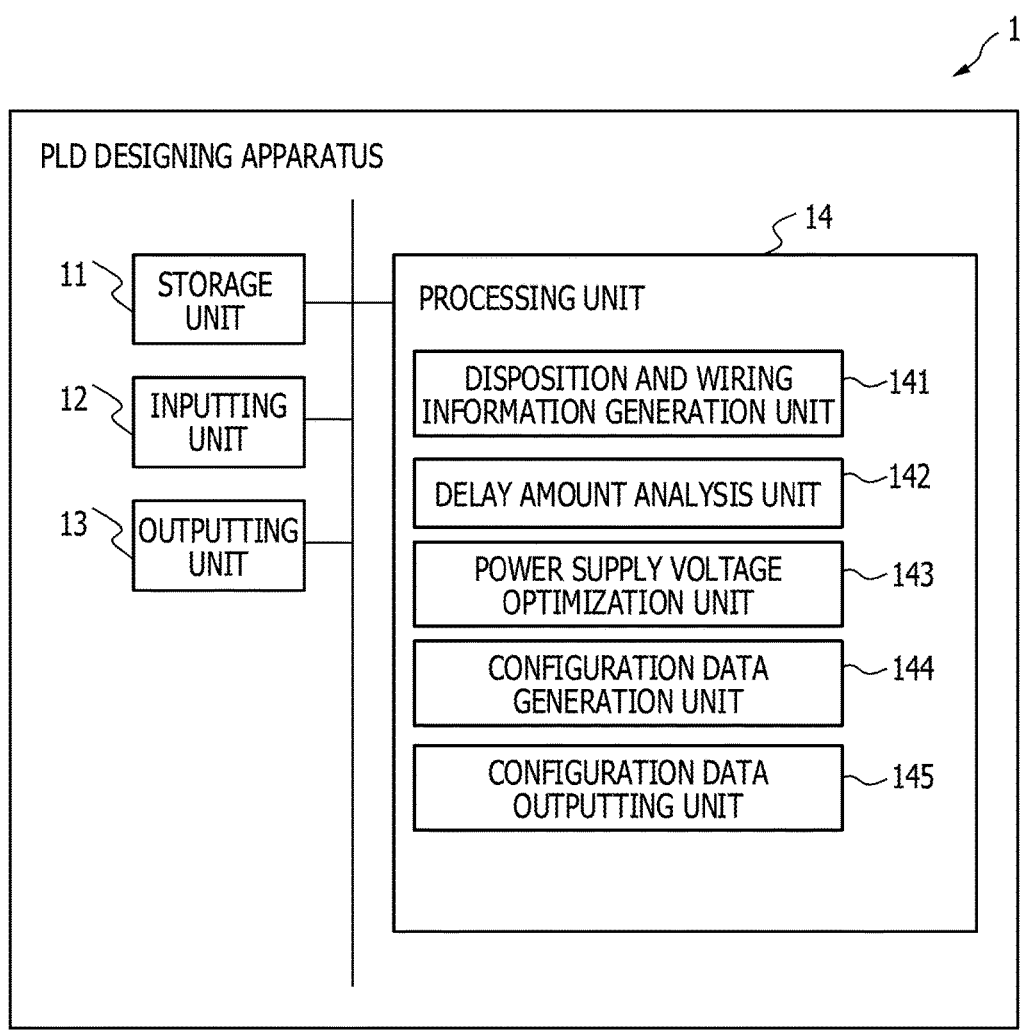
FIG. 1 is a circuit block diagram of a PLD designing apparatus according to a first embodiment.

Configuration and Function of PLD Designing Apparatus According to First Embodiment FIG. 1 is a circuit block diagram of a PLD designing apparatus according to a first embodiment.

A PLD designing apparatus 1 includes a storage unit 11, an inputting unit 12, an outputting unit 13 and a processing unit 14. The PLD designing apparatus 1 generates configuration data including disposition and wiring information and a power supply voltage value of an FPGA using RTL data, timing constraint data and a delay amount table (delay information).

The storage unit 11 includes at least one, for example, of a magnetic tape apparatus, a magnetic disk apparatus and an optical disk apparatus. The storage unit 11 stores therein an operating system program, a driver program, an application program, data and so forth for use in a process by the processing unit 14. For example, the storage unit 11 stores therein a configuration data generation program for causing the processing unit 14 to execute a process for generating configuration data of the FPGA as an application program. The configuration data generation program may otherwise be installed from a computer-readable portable recording medium such as, for example, a compact disc read only memory (CD-ROM) or a digital versatile disk-ROM (DVD-ROM) into the storage unit 11 using a known setup program or the like.

Further, the storage unit 11 stores therein RTL data, timing constraint data and a delay amount table for use in the configuration data generation process. The RTL data is data indicating logics of the logic circuit incorporated in the FPGA and includes a user circuit designed by a user and a voltage controlling circuit for controlling a power supply voltage. In an example, the timing constraint data is a synopsys design constraints (SDC) file and prescribes timing constraints for the logic circuit incorporated in the FPGA. Further, the storage unit 11 may temporarily store temporary data relating to a given process.

As the inputting unit 12, any device may be used if it can input data therethrough and may be, for example, a touch panel, a key button or the like. The operator can input characters, numerals, symbols and so forth using the inputting unit 12. If the operator operates the inputting unit 12, then the inputting unit 12 generates a signal corresponding to the operation. Then, the generated signal is supplied as an instruction from the operator to the processing unit 14.

As the outputting unit 13, any device may be used if it can display a video, an image and so forth and may be, for example, a liquid crystal display unit, an organic electroluminescence (EL) display unit or the like. The outputting unit 13 displays a video corresponding to video data supplied from the processing unit 14, an image corresponding to image data and so forth. Further, the outputting unit 13 may be an outputting apparatus that prints a video, an image, characters or the like on a displaying medium such as paper.

The processing unit 14 includes one or a plurality of processors and peripheral circuits thereof. The processing unit 14 totally controls general operation of the PLD designing apparatus 1 and is, for example, a central processing unit (CPU). The processing unit 14 executes processing on the basis of programs (a driver program, an operating system program, an application program and so forth) stored in the storage unit 11. Further, the processing unit 14 can execute a plurality of programs (application program and so forth) in parallel to each other.

The processing unit 14 includes a disposition and wiring information generation unit 141, a delay amount analysis unit 142, a power supply voltage optimization unit 143, a configuration data generation unit 144 and a configuration data outputting unit 145. The components are functional modules implemented by a program executed by the processor included in the processing unit 14. Alternatively, the components may be mounted as firmware on the PLD designing apparatus 1.

Figure 2:
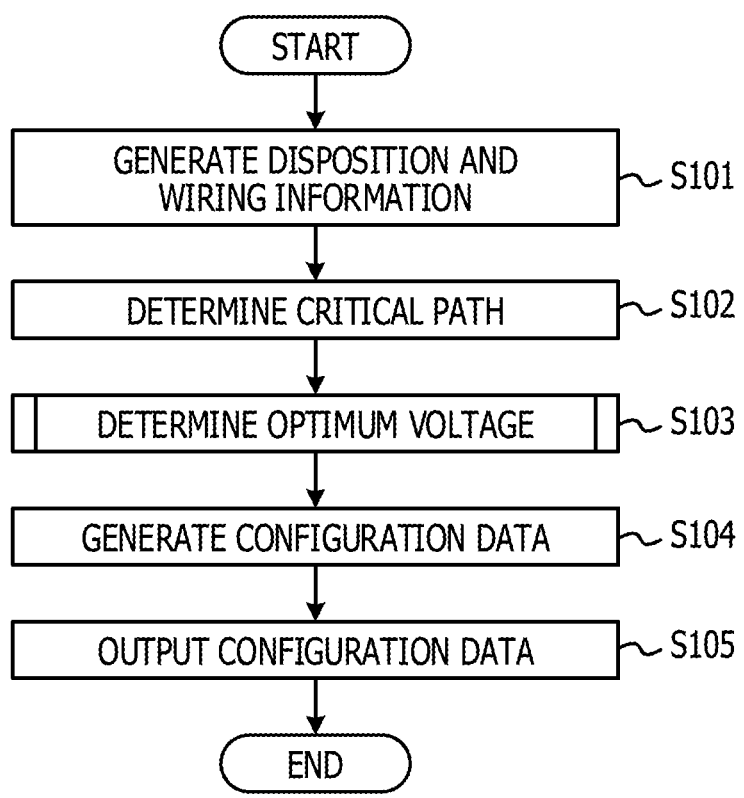
FIG. 2 is a flow chart illustrating a configuration data generation process by the PLD designing apparatus depicted in FIG. 1.

FIG. 2 is a flow chart illustrating a configuration data generation process by the PLD designing apparatus depicted in FIG. 1. The configuration data generation process is executed in cooperation with elements of the PLD designing apparatus 1 principally by the processing unit 14 on the basis of a program stored in advance in the storage unit 11.

First, the disposition and wiring information generation unit 141 performs logic synthesis using RTL data and timing constraint data stored in the storage unit 11 to generate a network list and generates disposition and wiring information from the generated network list (S101).

Figure 3:
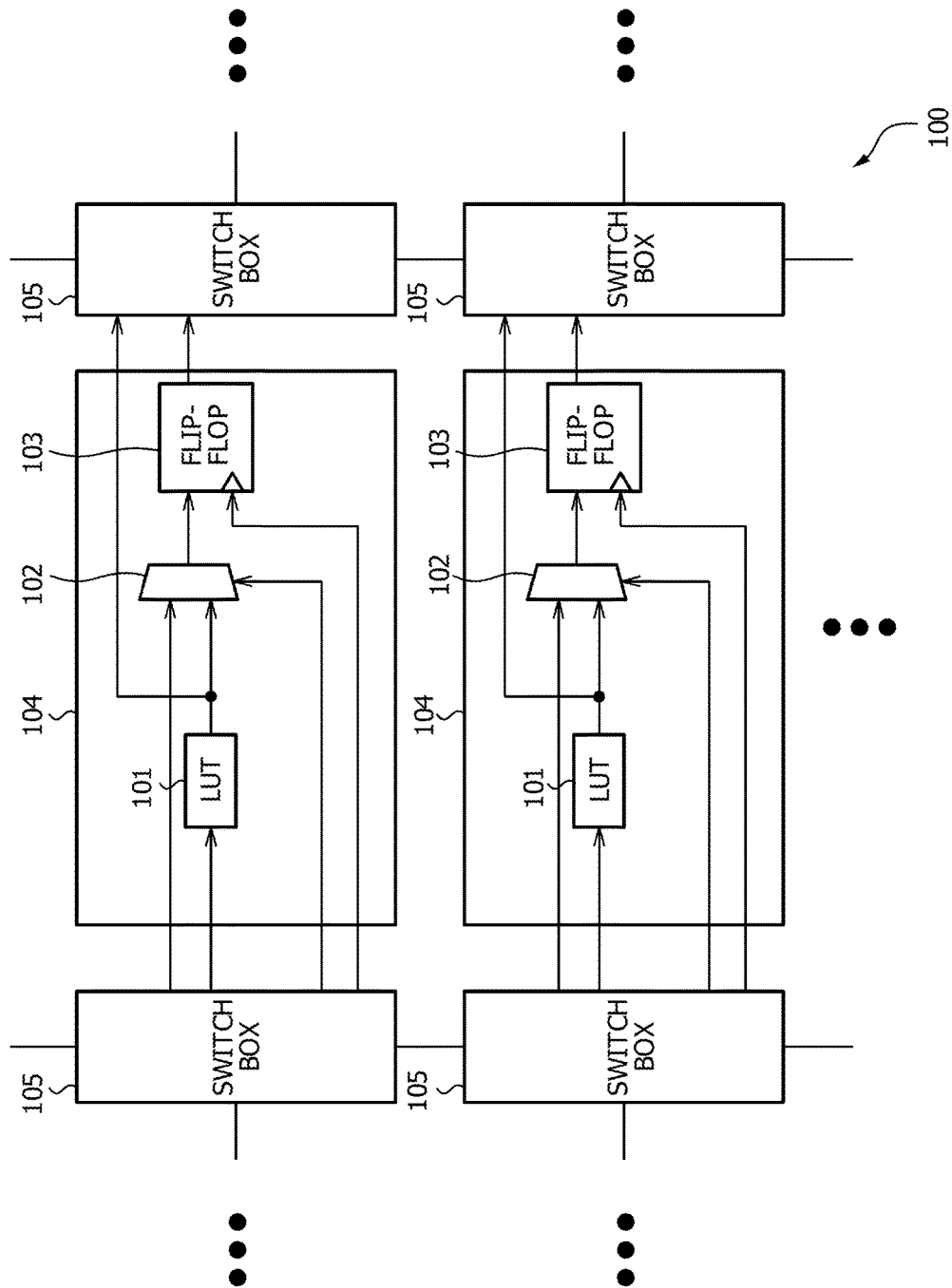
FIG. 3 is an internal circuit block diagram of an FPGA.

FIG. 3 is a block diagram of an internal circuit of an FPGA.

An FPGA 100 includes a plurality of logic circuit blocks 104 disposed in a reticular pattern and each including an look-up table (LUT) 101, a selector 102 and a flip-flop 103, and a plurality of switch boxes 105 individually coupling with the logic circuit blocks 104. The LUT 101 is a multi-input-one-output table and is formed from a memory having a scale corresponding to the number of inputs. For example, where the LUT 101 is a five-input-one-output table, it is formed from a memory of 32 bits. The LUT 101 implements a desired combination circuit in response to configuration data generated from the RTL data. The selector 102 selects and outputs one of a signal inputted from a different logic circuit block 104 through the switch box 105 and another signal outputted from the LUT 101 in response to configuration data generated from the RTL data. The flip-flop 103 latches the signal selected by the selector 102 in response to a clock inputted through the switch box 105 and outputs the latched signal to the different logic circuit block 104 through the switch box 105. It is to be noted that the configuration data is an example of configuration information.

The disposition and wiring information generation unit 141 allocates logics corresponding to a combination circuit of a logically synthesized network list to the LUT 101 and allocates a flip-flop included in the logically synthesized network list to the flip-flop 103.

After the process described above at step S101 is completed, the delay amount analysis unit 142 determines a critical path using the disposition and wiring information generated by the disposition and wiring information generation unit 141 and the delay amount table stored in the storage unit 11 (S102). The critical path is a path whose delay margin is smallest from among paths included in the logic circuit, the delay margin being referred to sometimes as worst negative slack (WNS).

FIG. 4 is a view illustrating an example of a delay amount table.

In the delay amount table, the delay amounts of the LUT 101 and the flip-flop 103 as well as the delay amounts per unit length of a data wiring line and a clock wiring line are prescribed for each of the power supply voltages within a given range. It is to be noted that, while also the delay amounts of the selector 102 and the switch box 105 may be prescribed in the delay amount table, such prescription of the delay amounts of the selector 102 and the switch box 105 is omitted here for simplified description.

The delay amount table prescribes a delay amount in the case where the fabrication condition and the temperature condition are worst for every 0.01 V from 0.90 V that is a minimum value of the power supply voltage to 1.10 V that is a maximum value of the power supply voltage centered at 1.00 V that is the prescribed value of the power supply voltage. For example, when the power supply voltage value is 1.00 V, the delay amount of the LUT 101 is 0.320 nanosecond and the delay amount of the flip-flop 103 is 0.280 nanosecond. Further, when the power supply voltage value is 1.00 V, the delay amount per unit length of the data wiring line is 0.100 nanosecond and the delay amount per unit length of the clock wiring line is 0.195 nanosecond.

FIG. 5A is a view depicting an example of a critical path, FIG. 5B is a view depicting a delay amount used when the critical path is determined and FIG. 5C is a view depicting a delay margin of the critical path. As depicted in FIG. 5B, the delay amount analysis unit 142 uses a delay amount in the case of 1.00 V that is a prescribed value of the power supply voltage when the critical path is determined.

A critical path circuit 110 is a circuit in which the delay margin of data of and a clock to a flip-flop 111 is smallest from within logic circuits incorporated in the FPGA 100. In the example of FIG. 5A, data of the flip-flop 111 is inputted through a flip-flop 112, a LUT 113 and a LUT 114. The wiring line length between the flip-flop 112 and the LUT 113 is eight times the unit length and the wiring line length between the LUT 113 and the LUT 114 is six times the unit length, and the wiring line length between the LUT 114 and the flip-flop 111 is seven times the unit length. On the other hand, the clock to the flip-flop 111 is inputted through a wiring line having a length of five times the unit length.

As depicted in FIG. 5C, in the critical path circuit 110, the delay margin (WNS) where the clock cycle is 2.857 (ns) is represented by:

$$WNS(ns) = \text{clock cycle} + \text{delay amount of clock path} - \text{delay amount of data path} = 2.857 + \{0.195 \times 5\} - \{10.28 + (0.10 \times 8) + 0.320 + (0.1 \times 6) + 0.320 + (0.10 \times 7)\} = 0.812 \text{ (ns)}$$

After the process described above at step S102 is completed, the power supply voltage optimization unit 143 determines a power supply voltage value with which the operation margin of the critical path is in the positive and is a minimum value as an optimum voltage value to be applied to the PLD using the table indicating a relationship between the power supply voltage and the delay amount (S103).

Then, the configuration data generation unit 144 generates configuration data including the disposition and wiring information generated by the disposition and wiring information generation unit 141 and the optimum voltage value determined by the power supply voltage optimization unit 143 (S104).

Then, the configuration data outputting unit 145 outputs the configuration data generated by the configuration data generation unit 144 to the storage unit 11 (S105).

Figure 6:
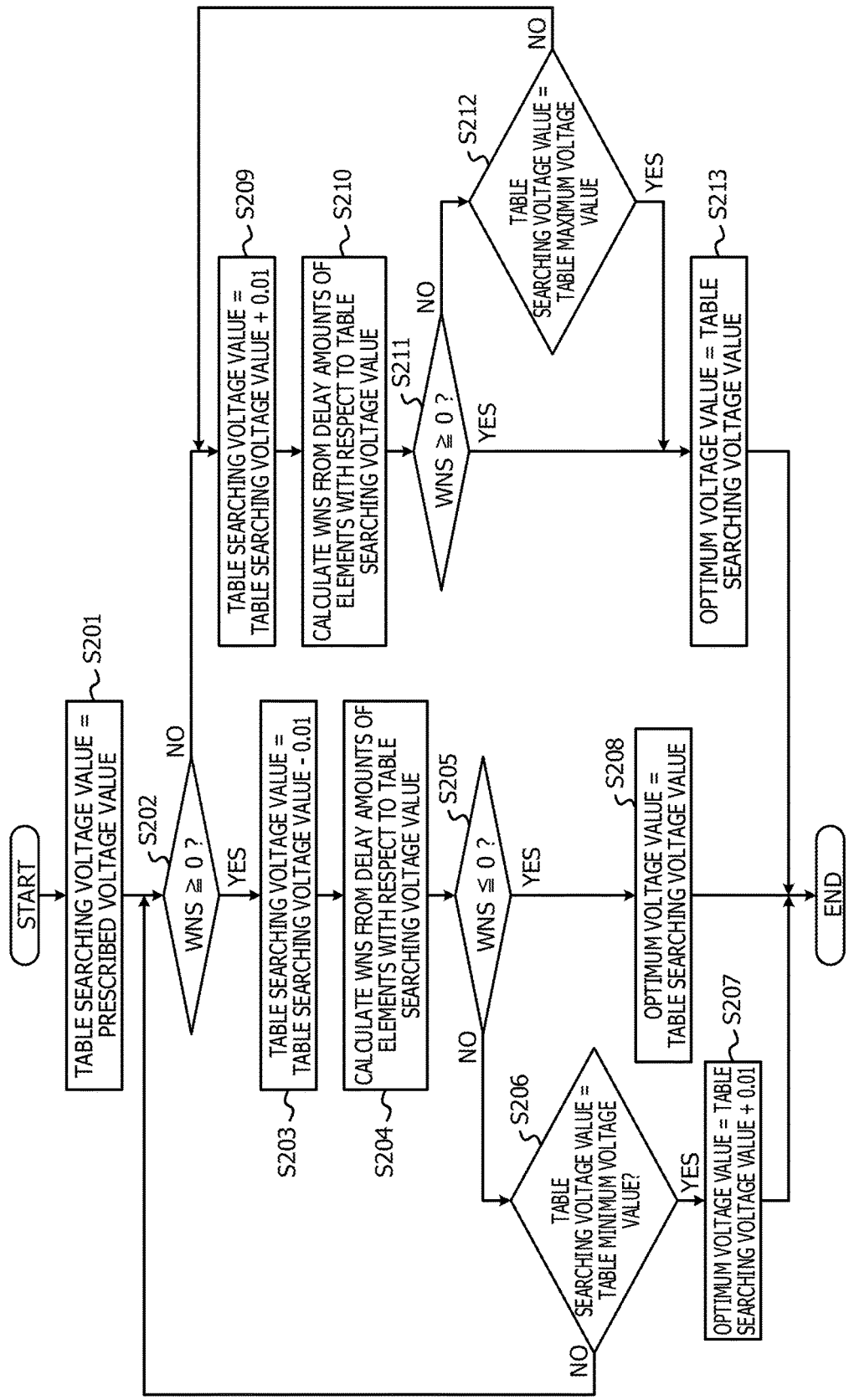
FIG. 6 is a flow chart illustrating a more detailed processing flow of a process at step S103 depicted in FIG. 2.

FIG. 6 is a flow chart illustrating a more detailed processing flow of the process at step S103 depicted in FIG. 2.

First, the power supply voltage optimization unit 143 determines the prescribed voltage value 1.00 V that is a power supply voltage value when the critical path is determined as a table searching voltage value (S201). Then, the power supply voltage optimization unit 143 decides whether or not the delay margin is equal to or higher than 0 (S202). Since, in the example depicted in FIG. 5A, the delay margin is 0.812 nanosecond and is equal to or higher than 0, the processing advances to step S203, and the power supply voltage optimization unit 143 subtracts 0.01 V from the table searching voltage value to determine the table searching voltage value to 0.99 V (S203).

Then, the power supply voltage optimization unit 143 uses a delay amount when the power supply voltage value prescribed by the delay amount table is 0.99 V to calculate the delay margin (S204). The delay margin when the power supply voltage in the critical path depicted in FIG. 5A is 0.99 V is 0.577 nanosecond.

Then, the power supply voltage optimization unit 143 decides whether or not the delay margin when the power supply voltage value that is a new table searching voltage value is 0.99 V is equal to or lower than 0 (S205). Since the delay margin is 0.577 nanosecond and is higher than 0, the processing advances to step S206, and the power supply voltage optimization unit 143 decides that the table searching voltage value at present is not equal to a minimum value defined by the delay amount table (S206), and the processing returns to step 202. Thereafter, the power supply voltage optimization unit 143 repetitively performs the processes at the steps from step S202 to step S206 until it is decided that the delay margin is equal to or lower than 0 (S205) or it is decided that the table searching voltage value at present is equal to a minimum value prescribed by the delay amount table (S206).

The delay margin when the power supply voltage value is 0.96 V is –0.128 nanosecond, and, at step S205, the power supply voltage optimization unit 143 decides that the delay margin is equal to or lower than 0 and advances the processing to step S207. The power supply voltage optimization unit 143 determines 0.97 V obtained by adding 0.01 V to 0.96 as the optimum voltage value (S207).

Further, if the processes at the steps from step S202 to step S206 are repetitively performed and it is decided that the table searching voltage value at present is a minimum value of 0.90 V prescribed by the delay amount table (S206), then the processing advances to step S208. In this case, the power supply voltage optimization unit 143 determines 0.90 V that is the table searching voltage value at present as the optimum voltage value (S208).

On the other hand, if it is decided at step S202 by the power supply voltage optimization unit 143 that the delay margin is smaller than 0, then the processing advances to step S209. At step S209, the power supply voltage optimization unit 143 adds 0.01 V to the table searching voltage value at present to calculate a new table searching voltage value (S209). Then, the power supply voltage optimization unit 143 calculates a delay margin using the new table searching voltage value calculated at step S209 using the delay amount table (S210). Then, the power supply voltage optimization unit 143 decides whether or not the delay margin in the case of the new table searching voltage value is equal to or higher than 0 (S211). If it is decided by the power supply voltage optimization unit 143 that the delay margin in the case of the new table searching voltage value is lower than 0, then the processing advances to step S212. If it is decided at step S212 by the power supply voltage optimization unit 143 that the table searching voltage value at present is not equal to a maximum value defined by the delay amount table, then the processing returns to step S209. Thereafter, the power supply voltage optimization unit 143 repetitively performs the processes at the steps from step S209 to step S212 until it is decided that the delay margin is equal to or higher than 0 (S211) or it is decided that the table searching voltage value at present is equal to a maximum value prescribed by the delay amount table (S212).

If it is decided that the delay margin is equal to or higher than 0 (S211) or it is decided that the table searching voltage value at present is equal to a maximum value prescribed by the delay amount table (S212), then the processing advances to step S213. Then, the power supply voltage optimization unit 143 determines the table searching voltage value at present as the optimum voltage value (S213).

Figure 7:
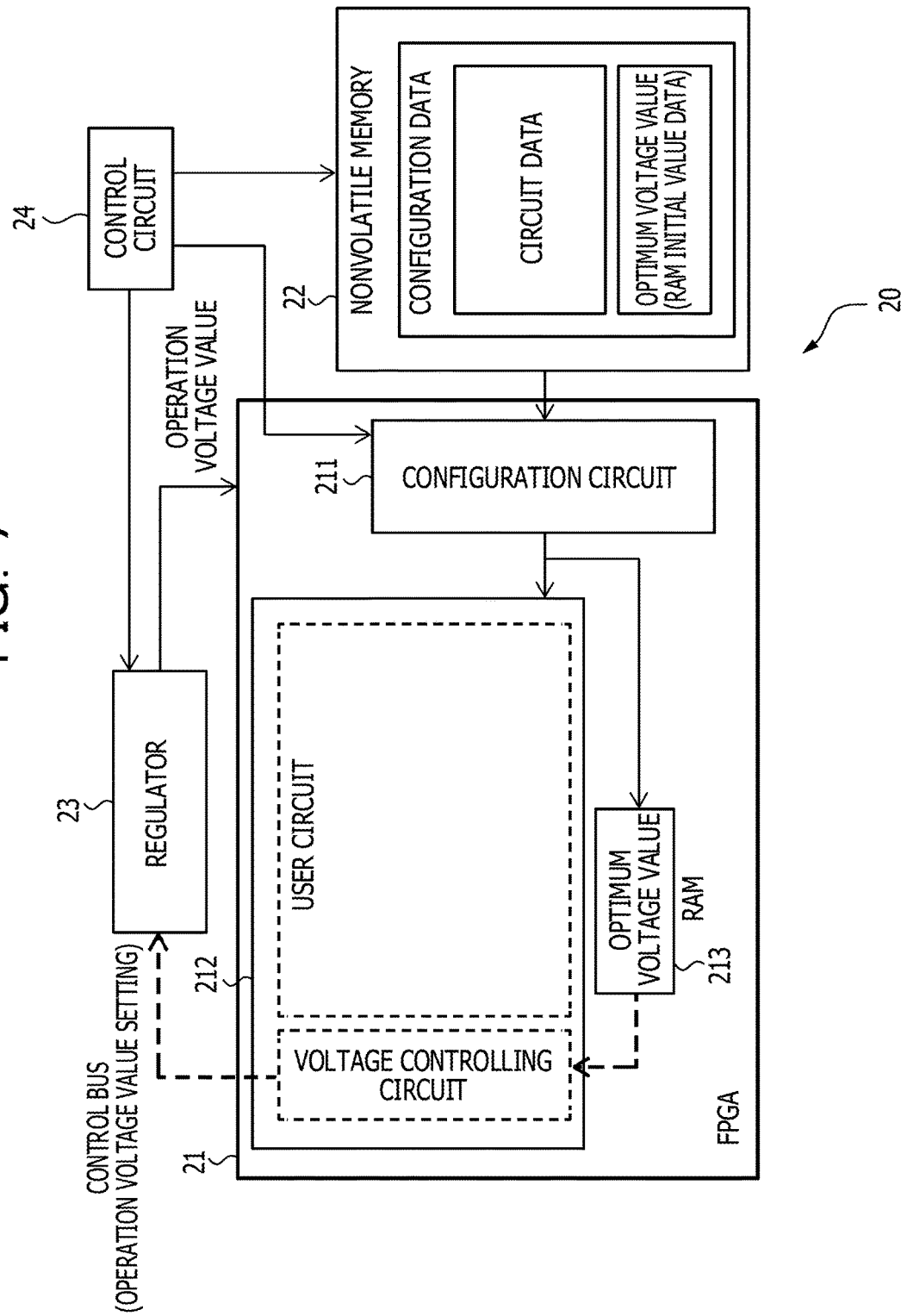
FIG. 7 is a circuit block diagram of an electronic apparatus in which an FPGA is incorporated.

FIG. 7 is a circuit block diagram of an electronic apparatus in which an FPGA is incorporated.

An electronic apparatus 20 includes an FPGA 21, a storage apparatus 22, a regulator 23 and a control circuit 24. The FPGA 21 includes a configuration circuit 211, a cell region 212 and a random access memory (RAM) 213. The storage apparatus 22 is a nonvolatile memory such as a flash memory and stores configuration data generated by the PLD designing apparatus 1. The regulator 23 is a power supply apparatus that supplies a power supply voltage to the FPGA 21, and the control circuit 24 is a CPU and controls activation operation of the FPGA 21.

Figure 8:
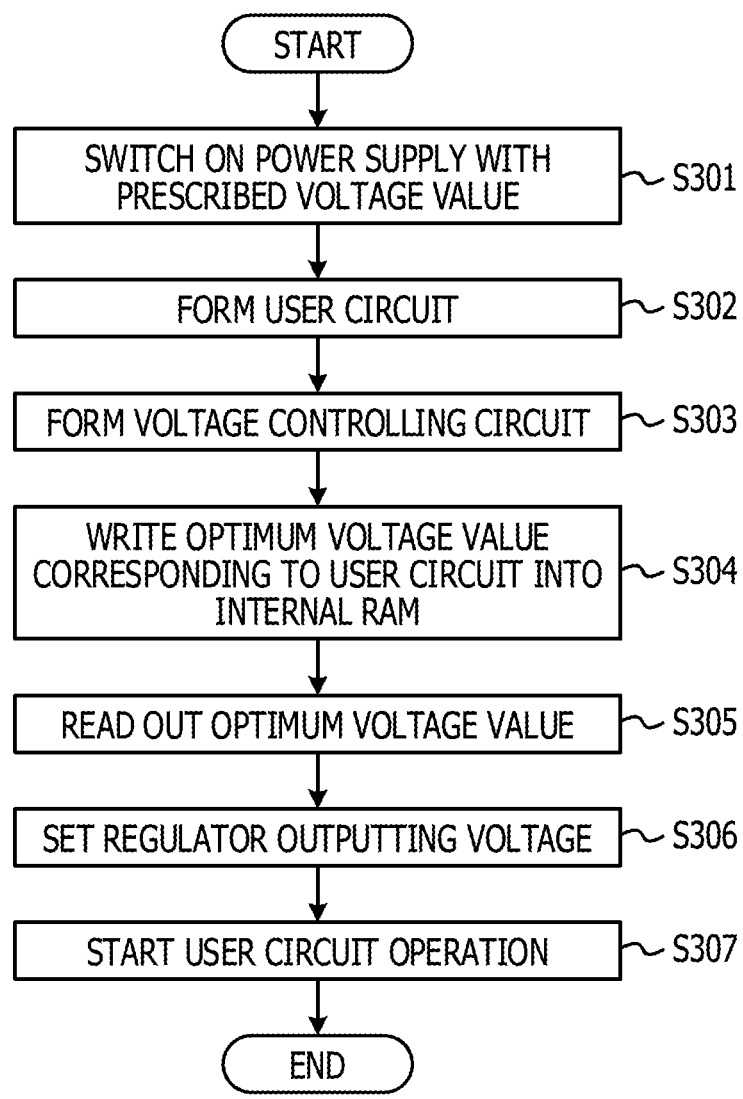
FIG. 8 is a flow chart illustrating activation operation of an electronic apparatus based on configuration data generated by the PLD designing apparatus depicted in FIG. 1.

FIG. 8 is a flow chart illustrating activation operation of an electronic apparatus based on configuration data generated by the PLD designing apparatus depicted in FIG. 1. The electronic apparatus explained in FIG. 8 may be the electronic apparatus 20 illustrated in FIG. 7.

First, the control circuit 24 controls the regulator 23 to operate such that 1.00 V that is the prescribed voltage value is supplied to the FPGA 21 (S301), and controls the configuration circuit 211 to read in the configuration data stored in the storage apparatus 22. After the configuration data is read in, the configuration circuit 211 forms a user circuit in the cell region 212 (S302) and forms a voltage controlling circuit in the cell region 212 (S303). Further, the configuration circuit 211 writes an optimum voltage value stored in the storage apparatus 22 into the RAM 213 (S304).

Then, the voltage controlling circuit formed in the cell region 212 reads out the optimum voltage value from the RAM 213 (S305) and then sets the optimum voltage value as a regulator outputting voltage value to be outputted from the regulator 23 to the FPGA 21 (S306). Then, the user circuit formed in the cell region 212 starts operation (S307).

The PLD designing apparatus according to the first embodiment can optimize the delay amount of a critical path using the delay amount table in which a delay amount is prescribed for each power supply voltage to optimize the power supply voltage value. In the delay amount table, a delay amount for each LUT, each flip-flop and each delay amount per unit length of each data wiring line and each clock wiring line are stored.

Figure 9:
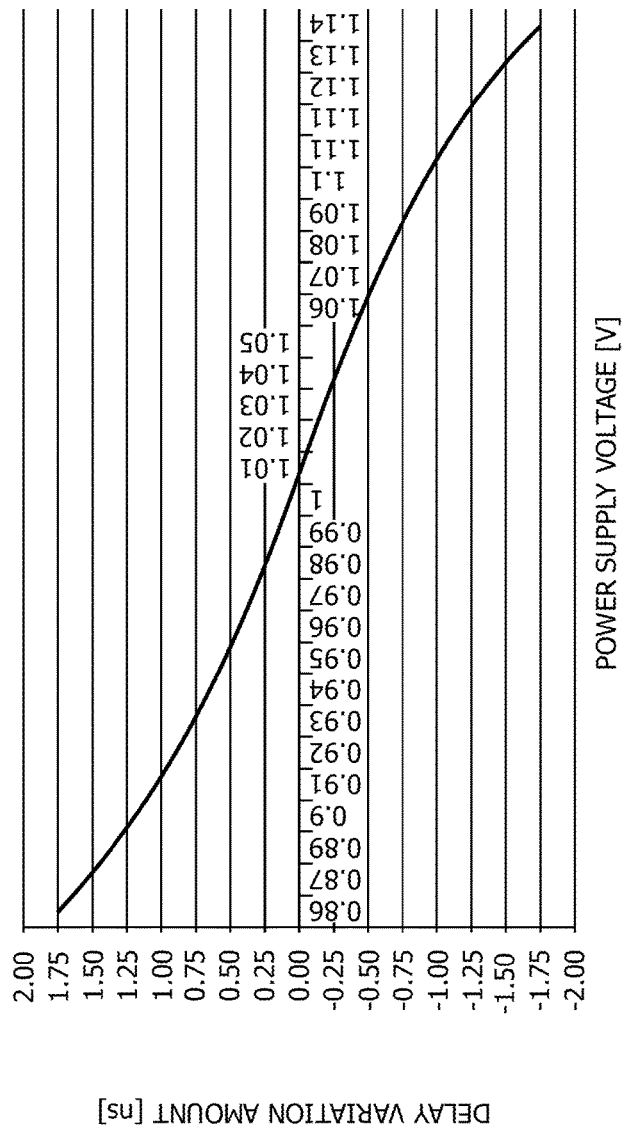
FIG. 9A is a view illustrating a relationship between a variation of a power supply voltage and a variation amount of delay in an example of a critical path and FIG. 9B is a view illustrating a relationship of a variation of a power supply voltage of the critical path depicted in FIG. 9A and a delay margin.

FIG. 9A is a view illustrating a relationship between a variation of a power supply voltage and a variation amount of delay in an example of a critical path and FIG. 9B is a view illustrating a relationship of a variation of a power supply voltage of the critical path depicted in FIG. 9A and a delay margin.

In the PLD designing apparatus according to the first embodiment, where the delay margin of the critical path in the prescribed voltage value is in the positive, the power supply voltage of the FPGA is set lower than the prescribed voltage value such that the delay margin is minimized. In the PLD designing apparatus according to the first embodiment, by setting the power supply voltage of the FPGA lower than the prescribed voltage value such that the delay margin is minimized, the power consumption of the FPGA can be reduced in comparison with that in the case where the FPGA operates with the prescribed voltage value.

In the PLD designing apparatus according to the first embodiment, where the delay margin of the critical path in the prescribed voltage value is in the negative, the power supply voltage of the FPGA is set higher than the prescribed voltage value such that the delay margin becomes in the positive. In the PLD designing apparatus according to the first embodiment, by setting the power supply voltage of the FPGA higher than the prescribed voltage value such that the delay margin becomes in the positive, the delay condition of the critical path that does not satisfy the delay condition with the prescribed voltage value can be satisfied. In the PLD designing apparatus according to the first embodiment, since the delay condition of the critical path that does not satisfy the delay condition with the prescribed voltage value is satisfied by increasing the power supply voltage of the FPGA, timing constraint to the FPGA can be moderated. In particular, in the PLD designing apparatus according to the first embodiment, since the timing constraint that permits existence of a path that does not satisfy the delay condition with the prescribed voltage value can be achieved, the cost for disposition and wiring of the FPGA such as a disposition and wiring time period can be reduced.

Figure 10:
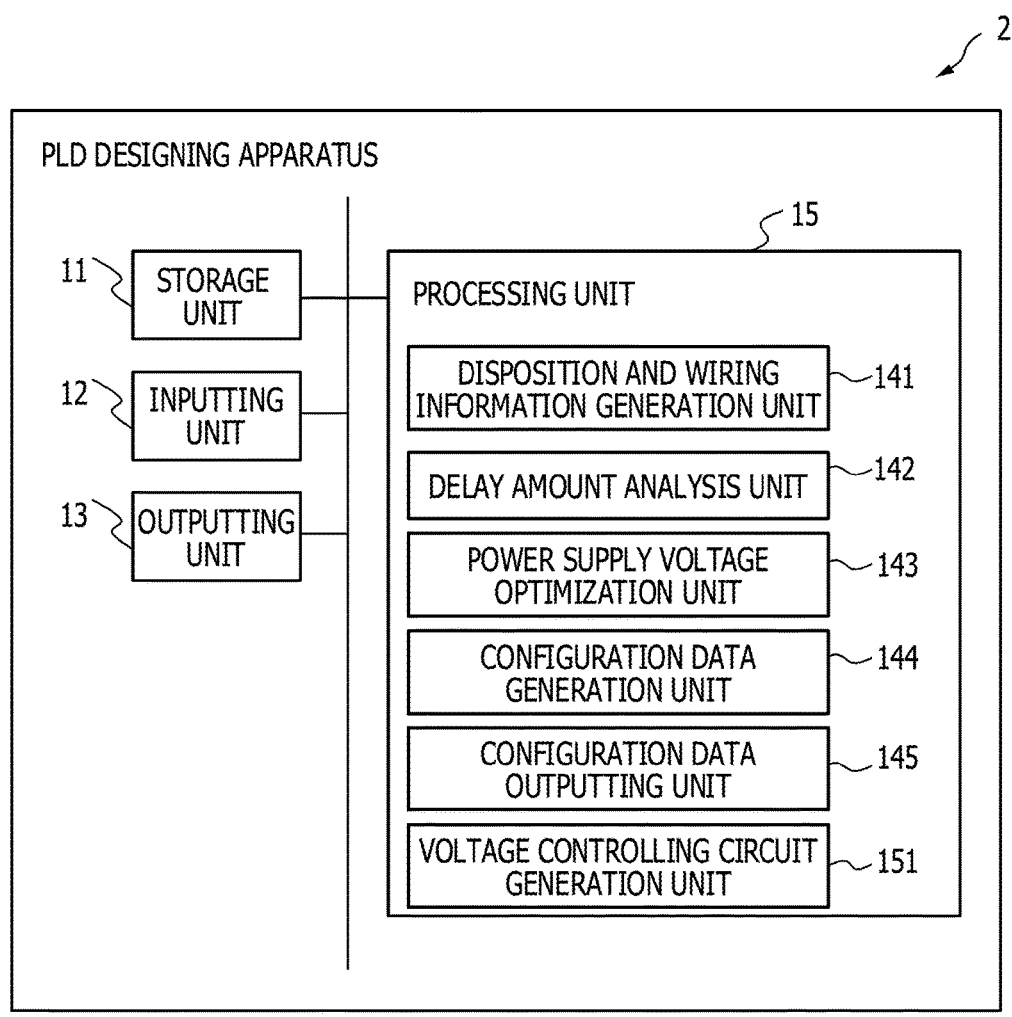
FIG. 10 is a circuit block diagram of a PLD designing apparatus according to a second embodiment.

Configuration and Function of PLD Designing Apparatus According to Second Embodiment FIG. 10 is a circuit block diagram of a PLD designing apparatus according to a second embodiment.

A PLD designing apparatus 2 is different from the PLD designing apparatus 1 in that a processing unit 15 is provided in place of the processing unit 14. The processing unit 15 is different from the processing unit 14 in that the processing unit 15 includes a voltage controlling circuit generation unit 151. Since the components of the PLD designing apparatus 2 except for the voltage controlling circuit generation unit 151 have configurations and functions same as those of the components of the PLD designing apparatus 1 to which like reference numerals are applied, detailed description of them is omitted herein.

Figure 11:
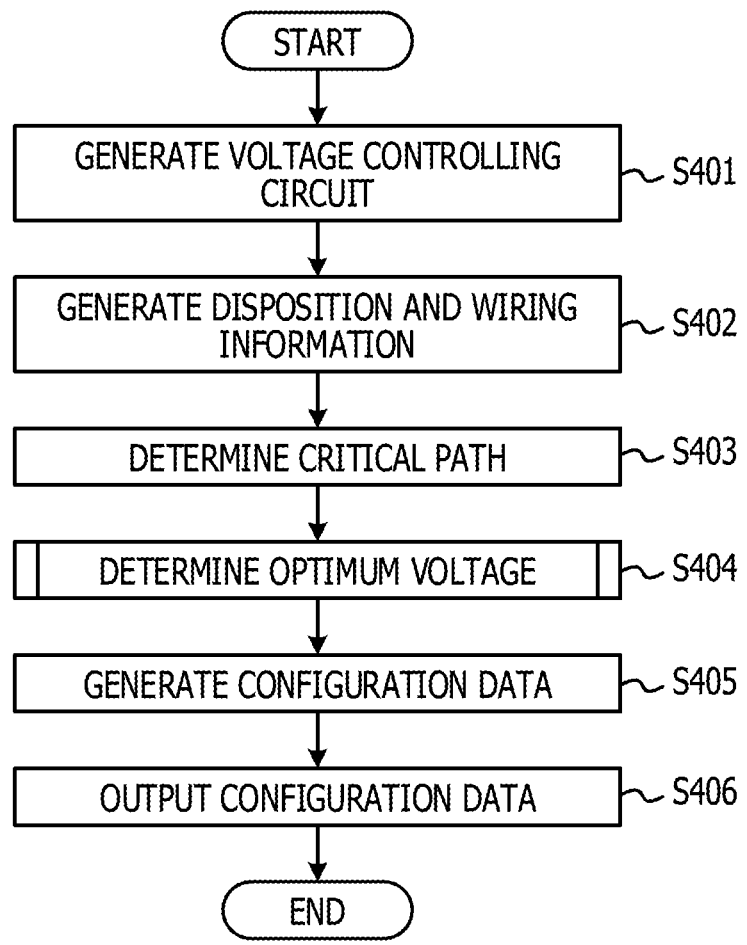
FIG. 11 is a flow chart of a configuration data generation process by the PLD designing apparatus depicted in FIG. 10.

FIG. 11 is a flow chart of a configuration data generation process by the PLD designing apparatus depicted in FIG. 10. The configuration data generation process is executed in cooperation with the elements of the PLD designing apparatus 2 principally by the processing unit 15 on the basis of a program stored in advance in the storage unit 11.

First, the voltage controlling circuit generation unit 151 generates RTL data for a voltage controlling circuit that controls a power supply voltage and stores the generated RTL data for the voltage controlling circuit into the storage unit 11 (S401).

Figure 12:
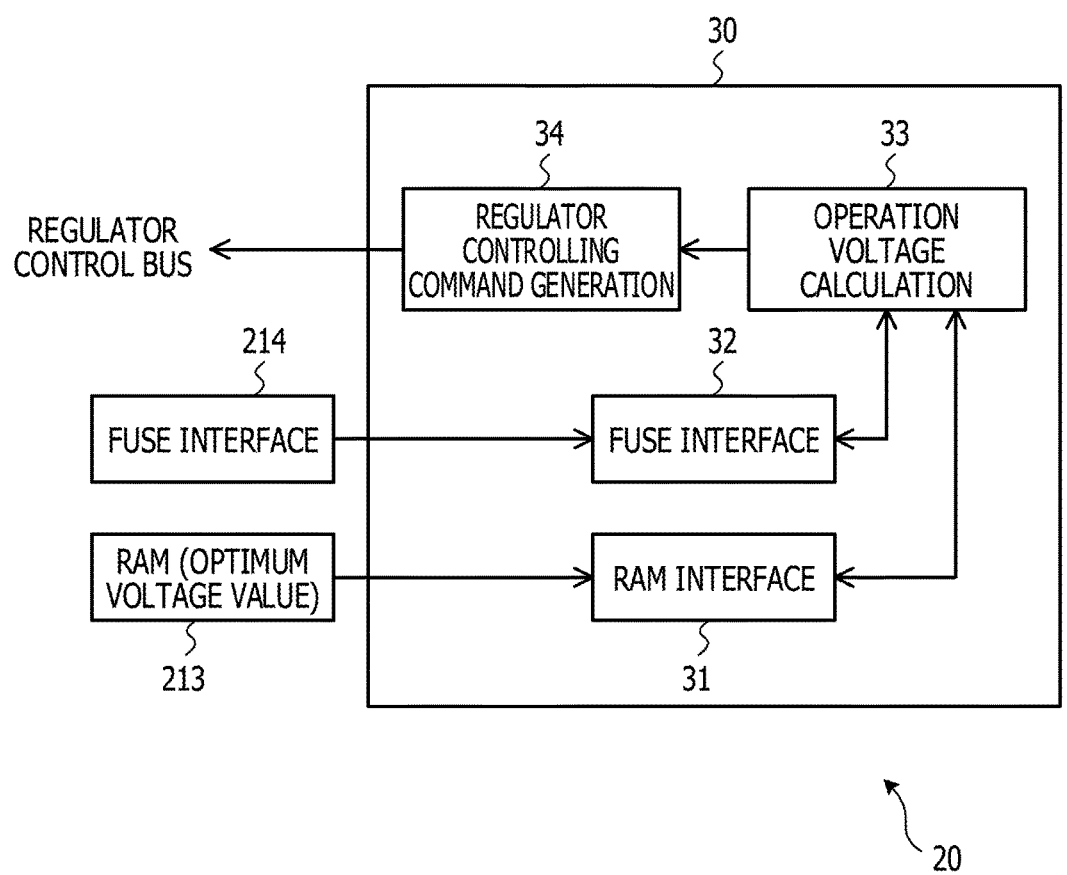
FIG. 12 is a circuit block diagram of a voltage controlling circuit corresponding to register transfer level (RTL) data generated by a process at step S401 depicted in FIG. 11.

FIG. 12 is a circuit block diagram of a voltage controlling circuit corresponding to RTL data generated by the process at step S401 depicted in FIG. 11.

A voltage controlling circuit 30 includes a RAM interface circuit 31, a fuse interface circuit 32, an operation voltage calculation circuit 33 and a regulator controlling command generation circuit 34. The RAM interface circuit 31 reads out an optimum voltage value stored in the RAM 213 and outputs the read out optimum voltage value to the operation voltage calculation circuit 33. The fuse interface circuit 32 reads out a unique voltage value Voltage ID (VID) indicated by a fuse 214 and outputs the read out unique voltage value VID to the operation voltage calculation circuit 33.

A unique voltage value VID that is an optimum power supply voltage corresponding to a fabrication dispersion of an FPGA measured in a test upon shipment of the FPGA is written into the fuse 214. The unique voltage value VID indicated by the fuse 214 is a power supply voltage value corresponding to a fabrication condition of the FPGA determined in accordance with which one of a fast condition and a slow condition the fabrication dispersion is, and is written into the fuse 214 upon shipment of the FPGA.

An operation voltage is calculated from the optimum voltage value stored in the RAM 213, the unique voltage value VID indicated by the fuse 214 and the prescribed voltage value. The operation voltage calculation circuit 33 calculates the operation voltage from the prescribed voltage value using the following description:

operation voltage value=unique voltage value VID−(prescribed voltage value−optimum voltage value)

For example, where the unique voltage value VID, prescribed voltage value and optimum voltage value are 0.97 V, 1.00 V and 0.98 V, respectively, the operation voltage value is calculated in the following manner:

operation voltage value=0.97−(1.00−0.98)=0.95 V

After the process described above at step S401 is completed, the delay amount analysis unit 142 performs logical synthesis using the RTL data and timing constraint data stored in the storage unit 11 to generate a network list and generates disposition and wiring information from the generated network list (S402). The RTL data stored in the storage unit 11 includes a user circuit designed by the user and the voltage controlling circuit 30 generated by the voltage controlling circuit generation unit 151.

Then, the delay amount analysis unit 142 determines a critical path using the disposition and wiring information generated by the disposition and wiring information generation unit 141 and the delay amount table stored in the storage unit 11 (S403). Here, the delay amount table to be used prescribes a delay amount when the fabrication condition is a typical condition and the temperature condition is worst. Since the unique voltage value VID is an optimum power supply voltage value corresponding to a fabrication dispersion of the FPGA, the delay amount of the delay amount table is prescribed as a delay amount where the fabrication condition is a typical condition.

Since the processes at the steps from step S404 to step S406 are similar to those at the steps from step S103 to step S105 depicted in FIG. 2 expect that the voltage controlling circuit 30 generated by the voltage controlling circuit generation unit 151 is processed, detailed description of them is omitted herein.

Figure 13:
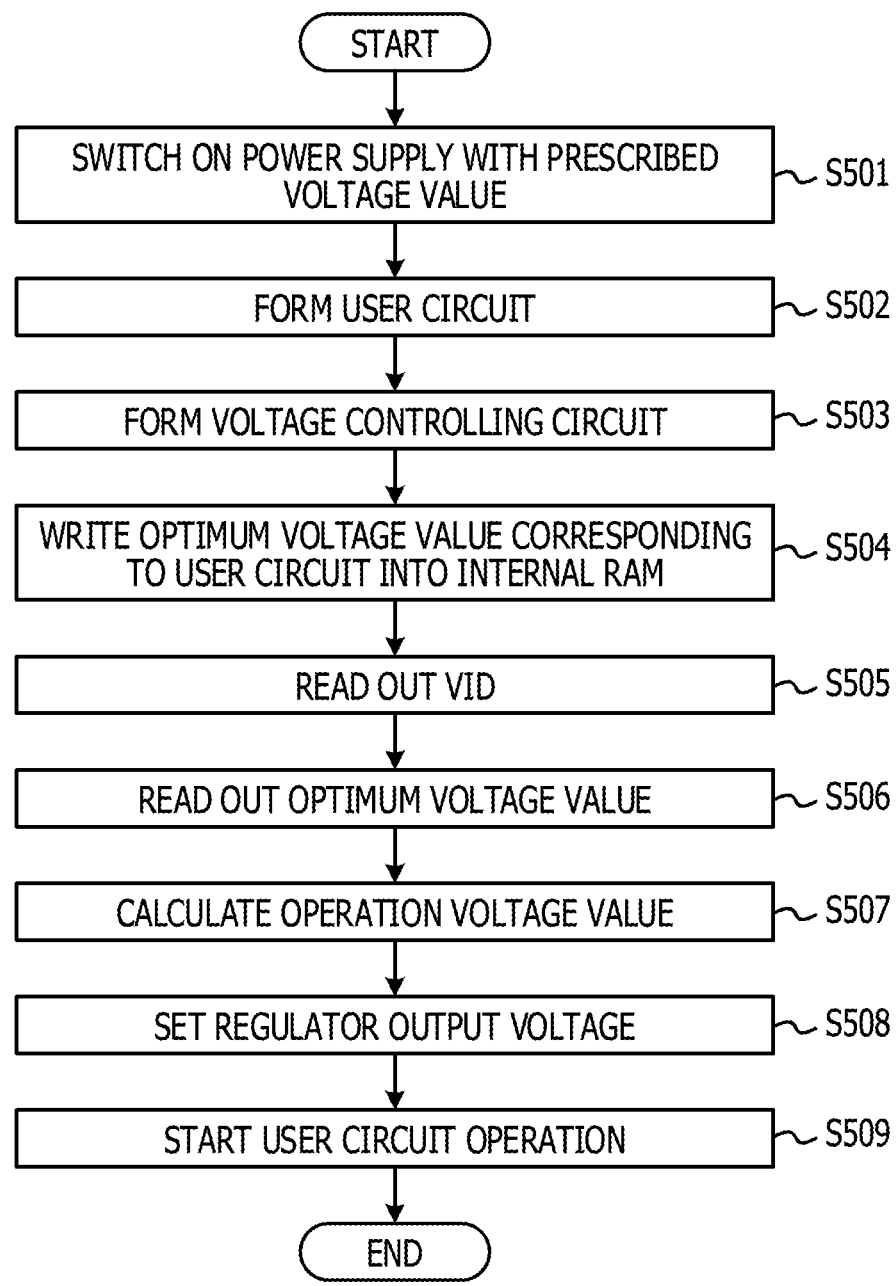
FIG. 13 is a flow chart illustrating activation operation of an electronic apparatus based on configuration data generated by the PLD designing apparatus depicted in FIG. 10.

FIG. 13 is a flow chart illustrating activation operation of an electronic apparatus based on configuration data generated by the PLD designing apparatus depicted in FIG. 10.

Since the processes at steps from step S501 to step S504 are similar to those at the steps from step S301 to step S304 depicted in FIG. 8 except that the voltage controlling circuit 30 corresponding to the RTL data generated by the voltage controlling circuit generation unit 151 is formed in the cell region 212, detailed description of them is omitted herein.

After the processes at the steps from step S501 to step S504, the voltage controlling circuit 30 reads out the unique voltage value VID indicated by the fuse 214 (S505) and reads out the optimum voltage value stored in the RAM 213 (S506) and then calculates an operation voltage value (S507). Then, the voltage controlling circuit 30 sets the calculated operation voltage value as a regulator output voltage value (S508). Then, the user circuit formed in the cell region 212 starts operation (S509).

Figure 14:
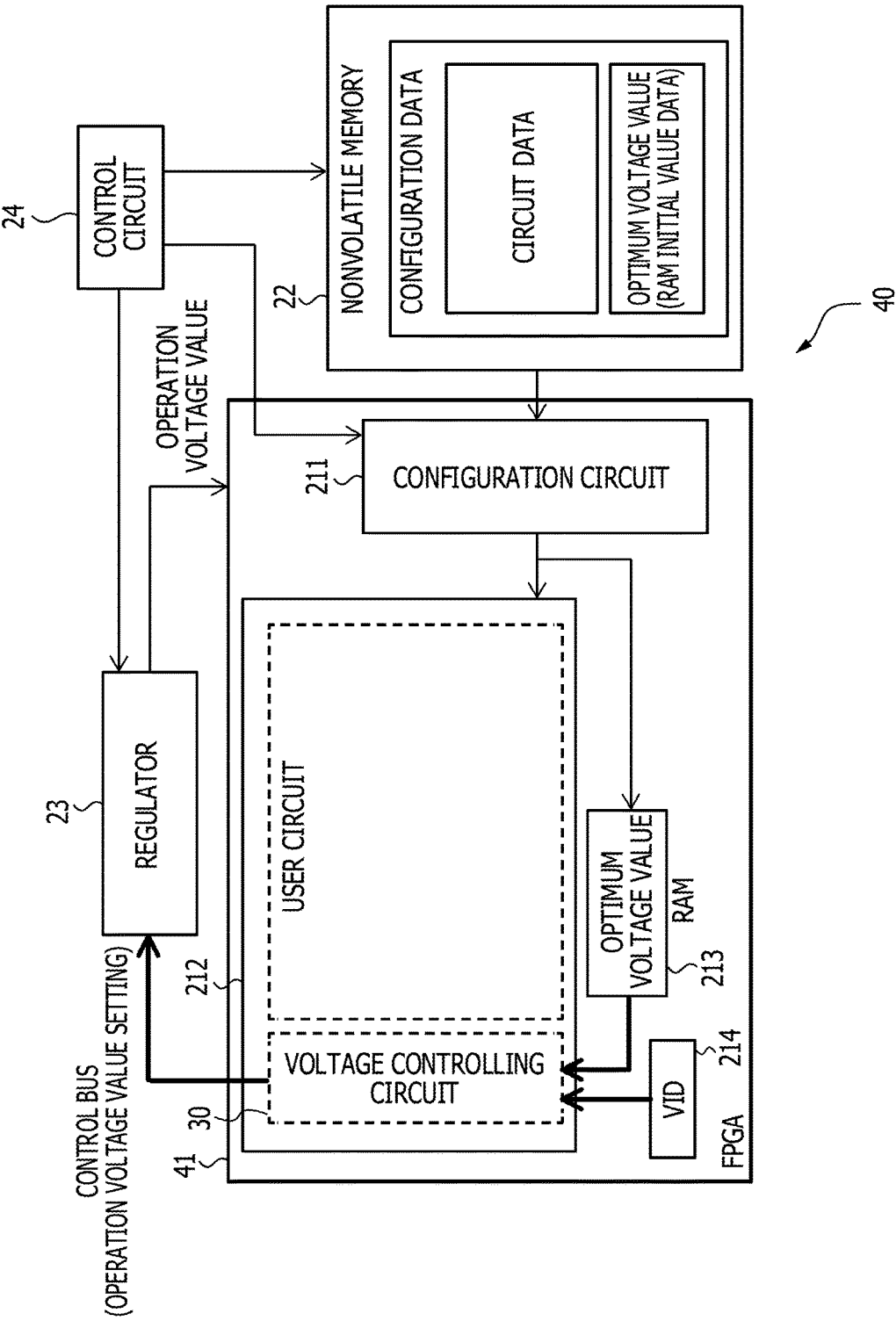
FIG. 14 is a circuit block diagram of an electronic apparatus for which activation operation based on configuration data generated by the PLD designing apparatus depicted in FIG. 10 is performed.

FIG. 14 is a circuit block diagram of an electronic apparatus for which activation operation based on configuration data generated by the PLD designing apparatus depicted in FIG. 10 is performed.

An electronic apparatus 40 is different from the electronic apparatus 20 in that the electronic apparatus 40 includes an FPGA 41 in place of the FPGA 21. The FPGA 41 is different from the FPGA 21 in that the FPGA 41 includes the fuse 214. Since the components of the electronic apparatus 40 other than the fuse 214 and the voltage controlling circuit 30 formed in the cell region 212 have configurations and functions same as those of the components of the electronic apparatus 20 to which like reference numerals are applied, detailed description of them is omitted herein.

As described hereinabove with reference to FIG. 12, the fuse 214 is a fuse in which the unique voltage value VID that is an optimum power supply voltage value corresponding to a fabrication dispersion of the FPGA measured in a test upon shipment of the FPGA is written. Further, the voltage controlling circuit 30 is generated by the voltage controlling circuit generation unit 151.

Working Effect of PLD Designing Apparatus According to Second Embodiment

Since the PLD designing apparatus according to the second embodiment uses a unique voltage value that is an optimum power supply voltage value corresponding to a fabrication dispersion of the FPGA, the optimum voltage value can be determined such that the dispersion is reflected thereon with a higher accuracy.

Figure 15:
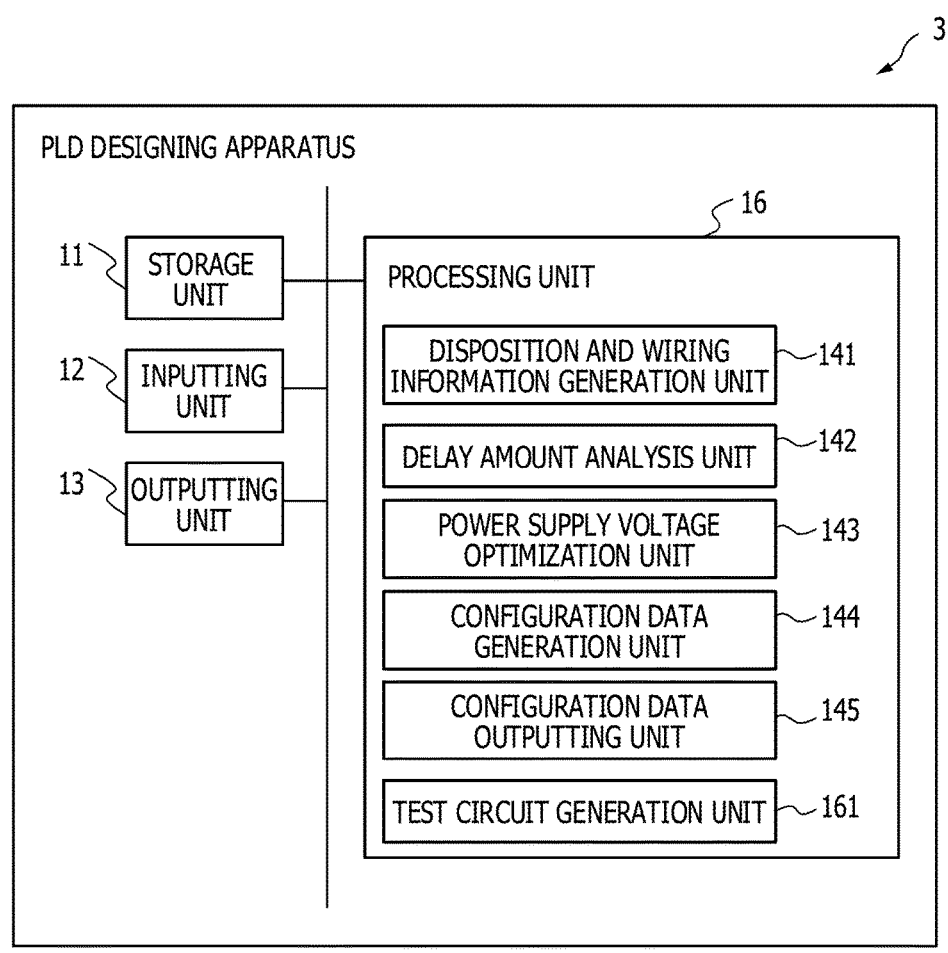
FIG. 15 is a circuit block diagram of a PLD designing apparatus according to a third embodiment.

Configuration and Function of PLD Designing Apparatus According to Third Embodiment FIG. 15 is a circuit block diagram of a PLD designing apparatus according to a third embodiment.

A PLD designing apparatus 3 is different from the PLD designing apparatus 1 in that the PLD designing apparatus 3 includes a processing unit 16 in place of the processing unit 14. The processing unit 16 is different from the processing unit 14 in that the processing unit 16 includes a test circuit generation unit 161. The components of the PLD designing apparatus 3 other than the test circuit generation unit 161 have configurations and functions same as those of the components of the PLD designing apparatus 1 to which like reference numerals are applied, detailed description of them is omitted herein.

Figure 16:
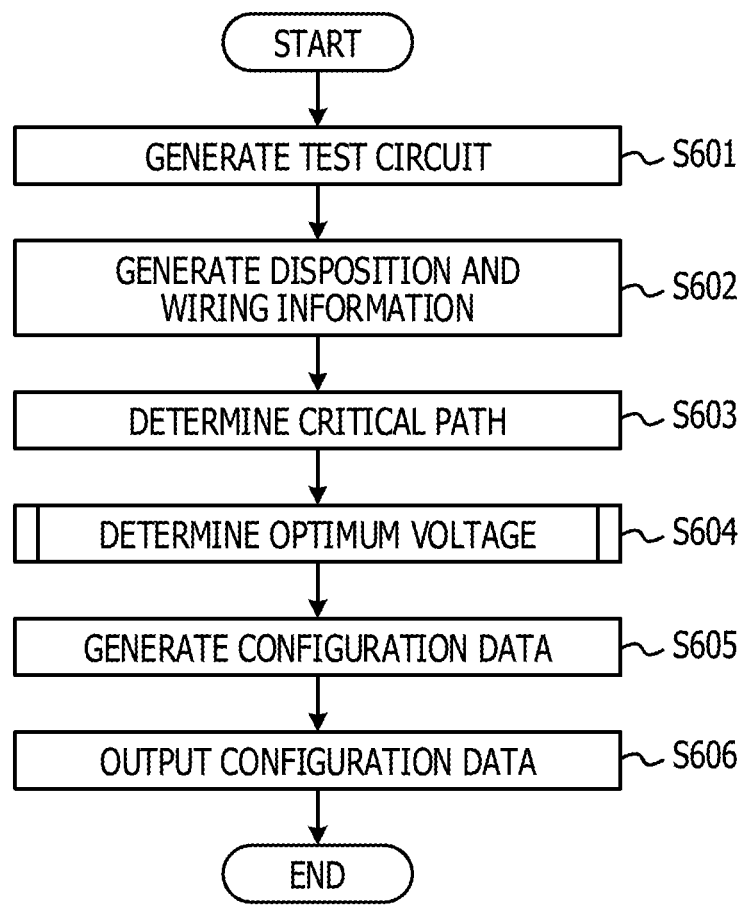
FIG. 16 is a flow chart of a configuration data generation process by the PLD designing apparatus depicted in FIG. 15.

FIG. 16 is a flow chart of a configuration data generation process by the PLD designing apparatus depicted in FIG. 15. The configuration data generation process is executed in cooperation with the elements of the PLD designing apparatus 3 principally by the processing unit 16 on the basis of a program stored in advance in the storage unit 11.

First, the test circuit generation unit 161 generates RTL data of a test circuit for checking a fabrication dispersion in the FPGA and stores the generated RTL data of the test circuit generation unit 161 into the storage unit 11 (S601).

Figure 17:
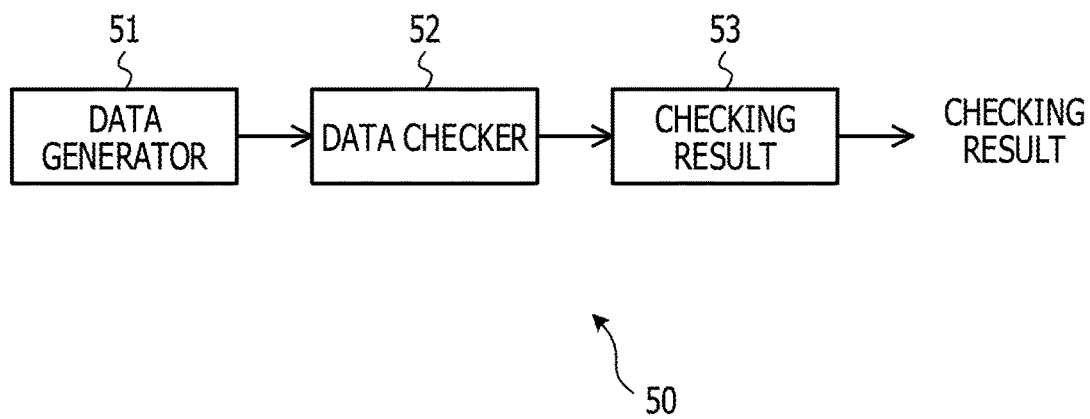
FIG. 17 is a circuit block diagram of a test circuit corresponding to RTL data generated by a process at step S601 depicted in FIG. 16.

FIG. 17 is a circuit block diagram of a test circuit corresponding to RTL data generated by the process at step S601 depicted in FIG. 16.

A test circuit 50 includes a data generator 51, a RAM 52 and a data checker 53. The data generator 51 and the data checker 53 are formed from an LUT and a flip-flop. The data generator 51 is formed such that the data generator 51 generates a test pattern and writes the generated test pattern into the RAM 52. The data checker 53 reads out the test pattern generated by the data generator 51 from the RAM 53, and executes a given process for the read out test pattern and outputs a result of the checking.

After the process described above at step S601 is completed, the delay amount analysis unit 142 performs logical synthesis using the RTL data and timing constraint data stored in the storage unit 11 to generate a network list and generates disposition and wiring information from the generated network list (S602). The RTL data stored in the storage unit 11 includes a user circuit designed by the user, a voltage controlling circuit and a test circuit generated by the test circuit generation unit 161. A plurality of test circuits 50 are included in the RTL data.

The delay amount analysis unit 142 performs disposition and wiring such that the plurality of test circuits 50 are disposed over the entire cell region 212. Further, the delay amount analysis unit 142 performs disposition and wiring such that the delay margin is 0 in regard to all of the plurality of test circuits 50.

Since the processes at the steps from step S603 to step S606 are similar to those at the steps from step S102 to step S105 depicted in FIG. 2 except that the test circuits 50 generated by the test circuit generation unit 161 are processed, detailed description of them is omitted herein.

Figure 18:
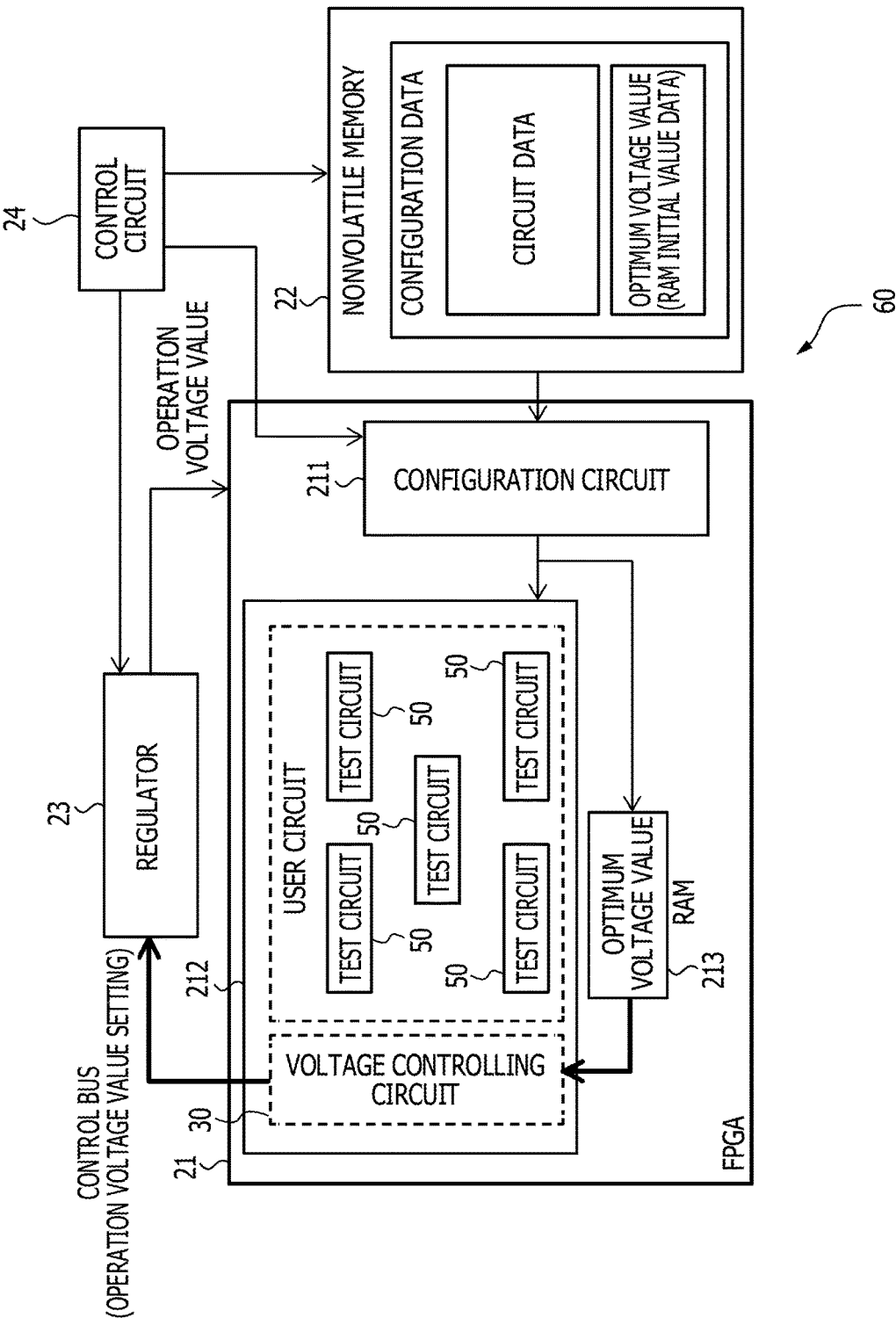
FIG. 18 is a circuit block diagram of an electronic apparatus for which activation operation based on configuration data generated by the PLD designing apparatus depicted in FIG. 15 is performed.

FIG. 18 is a circuit block diagram of an electronic apparatus for which activation operation based on configuration data generated by the PLD designing apparatus depicted in FIG. 15 is performed.

An electronic apparatus 60 is different from the electronic apparatus 20 in that the plurality of test circuits 50 are disposed in the cell region 212. Since the components of the electronic apparatus 60 other than the test circuit 50 have configurations and functions same as those of the components of the electronic apparatus 20 to which like reference numerals are applied, detailed description of them is omitted herein.

In the electronic apparatus 60, the plurality of test circuits 50 are disposed over the entire cell region 212. Since, in the electronic apparatus 60, disposition and wiring are performed such that the delay margin of all of the test circuits 50 is 0, it can be verified that the test circuit 50 operates normally with an operation frequency set upon designing and a timing error does not occur. Since, by the test circuit 50, it can be verified that the test circuits 50 disposed over the entire cell region 212 operate normally with the operation frequency set upon designing, a fabrication dispersion in the cell region 212 can be guaranteed.

When the delay margin of the critical path represents a positive value, the PLD designing apparatuses 1 to 3 decrease the power supply voltage value to reduce the delay margin of the critical path calculated using the delay amount table. On the other hand, when the delay margin of the critical path represents a negative value, the PLD designing apparatuses 1 to 3 increase the power supply voltage value to adjust the delay margin of the critical path calculated using the delay amount table so as to be positive. However, in the PLD designing apparatuses according to the embodiments, the power supply voltage value may be adjusted such that the delay margin of the critical path calculated using the delay amount table is set to a desired value. For example, in the PLD designing apparatuses according to the embodiments, the power supply voltage value may be adjusted such that the delay margin of the critical path indicates a given value.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A designing apparatus comprising:
   a memory configured to store disposition and wiring information used for disposition and wiring of a logic circuit on a programmable logic device, and store delay amount information indicating a relationship between a power supply voltage value and a delay amount for each type of element in the logic circuit; and
   a processor configured to
      determine, based on the disposition and wiring information, a critical path of which a delay margin is least among paths included in the logic circuit,
      determine, based on the delay amount information, a first power supply voltage value at which the delay margin of the critical path is in a positive value and is a minimum value,
      generate first voltage information indicating the first power supply voltage value, and
      output the disposition and wiring information and the first voltage information to a first device, the first device including the programmable logic device, and the first device being configured to form the logic circuit on the programmable logic device in accordance with the disposition and wiring information, and
      output configuration data and second voltage information to the first device, the second voltage information indicating a unique voltage value corresponding to a fabric condition of the programmable logic device, the configuration data being configured to cause the first device to form a voltage control circuit on the programmable logic device, the voltage control circuit being configured to control a operation voltage that is supplied to the logic circuit on the programmable logic device in accordance with the first power supply voltage indicated in the first voltage information and the unique voltage value indicated in the second voltage information.

2. The designing apparatus according to claim 1, wherein the processor is configured to decrease, when the delay margin of the critical path indicates the positive value, the first power supply voltage value to reduce the delay margin.

3. The designing apparatus according to claim 1, wherein the processor is configured to increase, when the delay margin of the critical path indicates a negative value, the first power supply voltage value to set the delay margin to the positive value.

4. The designing apparatus according to claim 1, wherein the logic circuits includes a control circuit to control the power supply voltage for the logic circuit.

5. A method executable by a processor, the processor being coupled to a memory configured to store disposition and wiring information used for disposition and wiring of a logic circuit on a programmable logic device, and store delay amount information indicating a relationship between a power supply voltage value and a delay amount for each type of element in the logic circuit, the method comprising:
   reading, from the memory, the disposition and wiring information;
   determining, based on the disposition and wiring information, a critical path of which a delay margin is least among paths included in the logic circuit;
   reading, from a memory, the delay amount information;
   determining, based on the delay amount information, a first power supply voltage value at which the delay margin of the critical path is in a positive value and is a minimum value;
   generating first voltage information indicating the first power supply voltage value; and
   outputting the disposition and wiring information and the first voltage information to a first device, the first device including the programmable logic device, and the first device being configured to form the logic circuit on the programmable logic device in accordance with the disposition and wiring information, and
   outputting configuration data and second voltage information to the first device, the second voltage information indicating a unique voltage value corresponding to a fabric condition of the programmable logic device, the configuration data being configured to cause the first device to form a voltage control circuit on the programmable logic device, the voltage control circuit being configured to control a operation voltage that is supplied to the logic circuit on the programmable logic device in accordance with the first power supply voltage indicated in the first voltage information and the unique voltage value indicated in the second voltage information.

6. The method according to claim 5, wherein the determining the first power supply voltage value includes decreasing, when the delay margin of the critical path indicates the positive value, the first power supply voltage value to reduce the delay margin.

7. The method according to claim 5, wherein the determining the first power supply voltage value includes increasing, when the delay margin of the critical path indicates a negative value, the first power supply voltage value to set the delay margin to the positive value.

8. The method according to claim 5, wherein the logic circuits includes a control circuit to control the power supply voltage for the logic circuit.

9. A non-transitory computer-readable medium for storing computer-executable program that cause a processor to execute a process, the processor being coupled to a memory configured to store disposition and wiring information used for disposition and wiring of a logic circuit on a programmable logic device, and store delay amount information indicating a relationship between a power supply voltage value and a delay amount for each type of element in the logic circuit, the process comprising:

reading, from the memory, the disposition and wiring information;

determining, based on the disposition and wiring information, a critical path of which a delay margin is least among paths included in the logic circuit;

reading, from the memory, the delay amount information;

determining, based on the delay amount information, a first power supply voltage value at which the delay margin of the critical path is in a positive value and is a minimum value;

generating first voltage information indicating the first power supply voltage value; and outputting the disposition and wiring information and the first voltage information to a first device, the first device including the programmable logic device, and the first device being configured to form the logic circuit on the programmable logic device in accordance with the disposition and wiring information, and outputting configuration data and second voltage information to the first device, the second voltage information indicating a unique voltage value corresponding to a fabric condition of the programmable logic device, the configuration data being configured to cause the first device to form a voltage control circuit on the programmable logic device, the voltage control circuit being configured to control a operation voltage that is supplied to the logic circuit on the programmable logic device in accordance with the first power supply voltage indicated in the first voltage information and the unique voltage value indicated in the second voltage information.

10. The non-transitory medium according to claim 9, wherein the determining the first power supply voltage value includes decreasing, when the delay margin of the critical path indicates the positive value, the first power supply voltage value to reduce the delay margin.

11. The non-transitory medium according to claim 9, wherein the determining the first power supply voltage value includes increasing, when the delay margin of the critical path indicates a negative value, the first power supply voltage value to set the delay margin to the positive value.

12. The non-transitory medium according to claim 9, wherein the logic circuits includes a control circuit to control the power supply voltage for the logic circuit.

* * * * *